United States Patent [19]

Babcock et al.

[11] 4,176,303
[45] Nov. 27, 1979

[54] TELEVISION S-CORRECTION LINEARITY DEVICE

[75] Inventors: William E. Babcock, Warren, N.J.; Ronald L. Hess, Zionsville, Ind.

[73] Assignee: RCA Corporation, New York, N.Y.

[21] Appl. No.: 906,836

[22] Filed: May 17, 1978

[51] Int. Cl.² .................... H01J 29/70; H01J 29/76
[52] U.S. Cl. ................................. 315/400; 315/371
[58] Field of Search ..................... 315/400, 370, 371

[56] References Cited

U.S. PATENT DOCUMENTS

| 3,962,603 | 6/1976 | Van der Vegt | 315/370 |
| 3,968,402 | 7/1976 | Sahara et al. | 315/370 |

Primary Examiner—Theodore M. Blum
Attorney, Agent, or Firm—Eugene M. Whitacre; Paul J. Rasmussen; William H. Meise

[57] ABSTRACT

A wide-angle kinescope deflection arrangement using an S-capacitor for correction over a major central portion of the scan has a residual compression of the display at the extremes of the scan. A saturable reactor is coupled in series with the deflection winding and saturates near the extremes of the scan due to the large deflection current. The reduced impedance of the reactor in series with the deflection winding causes the time rate of change of the deflection current to increase at the scan extremes and thereby linearizes the display.

7 Claims, 3 Drawing Figures

TELEVISION S-CORRECTION LINEARITY DEVICE

BACKGROUND OF THE INVENTION

This invention relates to television kinescope deflection circuit devices and arrangements for improving the S-correction.

In television kinescopes or picture tubes in which an electron beam is deflected by a magnetic field generated by the flow of the deflection current in a deflection winding, certain nonlinearities of the generated raster appear. So-called "linearity" distortion results from the changeover at center of scan from damper diode to trace switch, and is corrected by a saturable reactor acting on only one side of scan. Side pincushion distortion requires a correction at both right and left sides of the raster by a device coupled in the horizontal circuit but controlled at the vertical deflection rate.

Another type of nonlinearity is attributable to the fact that the effective center of deflection of the electron beam is not coincident with the center of radius of curvature of the screen of the kinescope. The distance from the center of deflection to the edges of the kinescope faceplate is greater than the distance to the center of the kinescope faceplate or screen. This difference in distance tends to be greater in the case of kinescopes having large deflection angles, and also increases as the radius of curvature of the faceplate increases (as the faceplate becomes flatter).

As a result of this source of nonlinearity, the deflection of the electron beam as a function of time becomes progressively greater near the edges of the screen, as seen on the raster displayed on the screen of the kinescope. Since the information to be displayed in a television system is encoded at a constant rate, the information as displayed on the screen will appear to become compressed in the center of the raster and stretched or expanded near the edges.

A common method of compensating for the nonlinearity is to place an "S" capacitor in series with the deflection windings. With the addition of the S-capacitor, the deflection current rather than being a substantially linear ramp during the recurrent scanning intervals, becomes a segment of a sinewave having a reduction in the rate of increase of deflection current at the positive and negative extremes of the deflection current relative to that at the center. At the center, the rate of change of the deflection current increases relative to the edges. This in turn creates a slight reduction in the rate of scanning of the electron beam near the left and right edges of the raster relative to the center and a reduction in the edge expansion and center compression nonlinearity. When sinewave S-correction is used to linearize the compressed central portion of the raster being scanned and the kinescope has a large deflection angle or radius of curvature, the correction becomes excessive near the right and left edges of the raster. This overcompensation results in an apparent compression of the displayed video at the right and left of the raster.

SUMMARY OF THE INVENTION

An arrangement for deflecting the electron beam for a wide-angle kinescope includes a deflection winding and a deflection current generator for promoting the flow of deflection current at the deflection rate in the deflection winding. A raster is scanned on the face of the kinescope. The raster has a bilateral geometric distortion giving the appearance of progressively greater expansion towards the raster sides and progressively greater compression towards the raster center. An S-correction capacitor is coupled to the deflection winding for symmetrically correcting the compression towards the raster center. The S-capacitor overcorrects the raster sides and causes an apparent compression. A variable impedance device is coupled to the deflection winding and is varied at the deflection rate for linearity correction. The variable impedance is varied in a bilateral manner to increase the time rate of change of the deflection current towards the sides of the raster to compensate the overcorrection.

DESCRIPTION OF THE INVENTION

Figure 1:
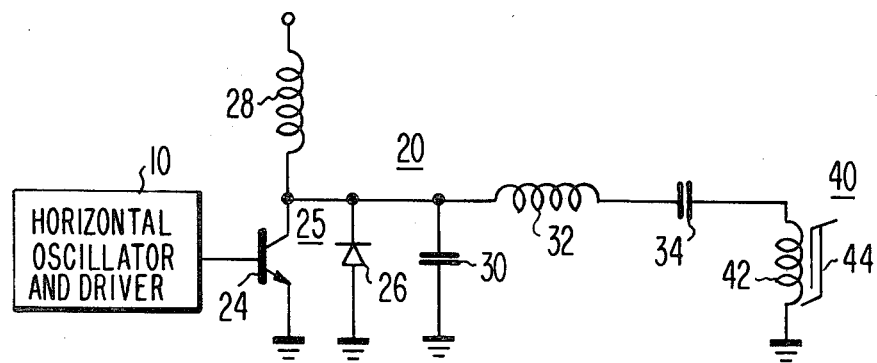
FIG. 1 is a diagram in block and schematic form of a television deflection circuit embodying the invention.

Generally speaking, FIG. 1 illustrates a television horizontal deflection circuit designated as 20 of a type which is well-known, driven by a horizontal oscillator 10. A linearity correction circuit designated generally as 40 is coupled to deflection circuit 20.

Deflection circuit 20 includes a horizontal output switching transistor 24 having its emitter coupled to ground. The collector of transistor 24 is coupled to the cathode of a diode 26, the anode of which is coupled to ground. Transistor 24 and diode 26 together form a bidirectional switch designated generally as 25. The collector of transistor 24 is coupled to one end of a horizontal deflection winding 32, the other end of which is coupled to an S-shaping capacitor 34. A retrace capacitor 30 has one end grounded and the other end coupled to the junction of deflection winding 32 and the collector of transistor 24.

Energy is coupled to deflection circuit 20 from B+ by means of an inductor 28 coupled from B+ to the collector of transistor 24. The base of transistor 24 is driven from a horizontal oscillator 10 synchronized by pulses from a synchronizing signal separator, not shown.

Linearity correction circuit 40 includes an inductor 42 having a core 44 of a saturable magnetic material. Inductor 42 is coupled in series with winding 32 and S-shaping capacitor 34. One end of inductor 42 is grounded.

Figure 2:
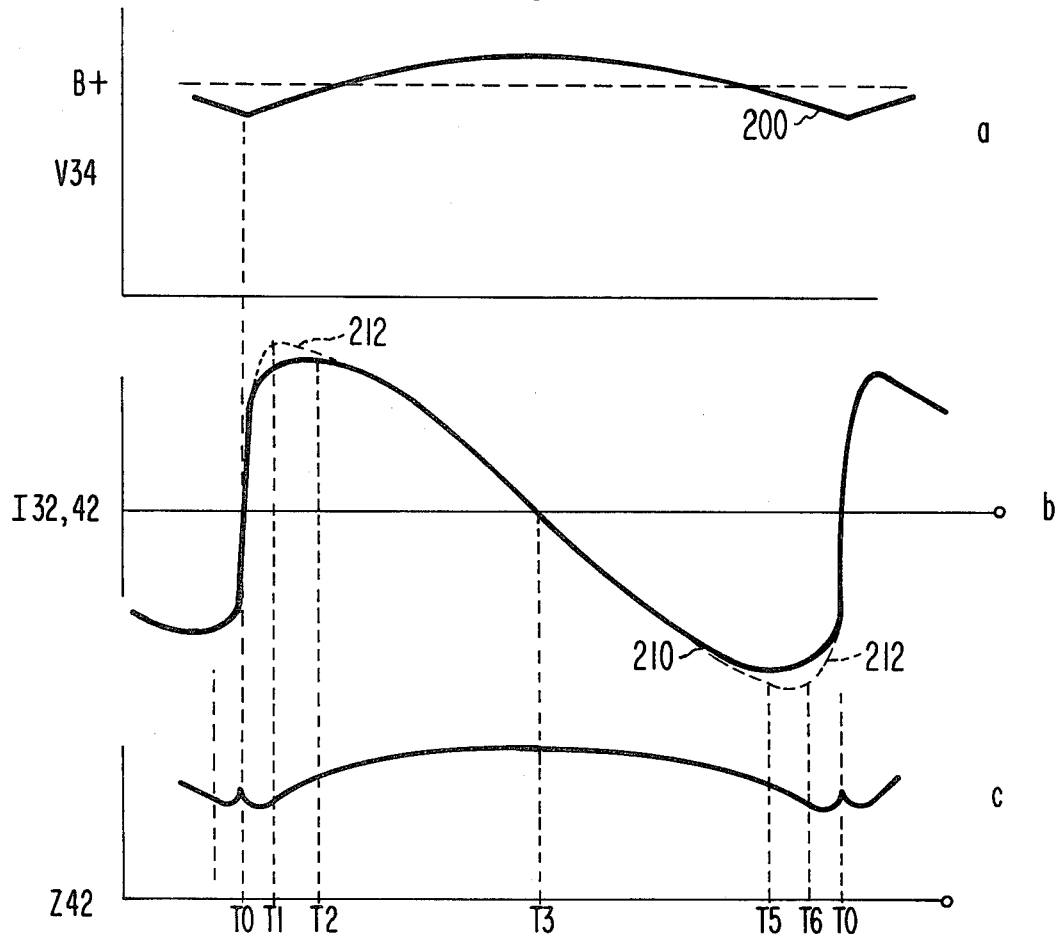
FIG. 2 represents amplitude-time waveforms and component characteristics occurring in the arrangement of FIG. 1 during operation.

While the operation of a horizontal deflection circuit such as 20 is well-known, a brief description follows. During the second half T3-T6 of the horizontal scanning or trace interval, transistor 24 is saturated and its collector is essentially at ground potential. A linearly increasing conventional current flows from B+ through inductor 28 and the collector of transistor 24 to ground. Simultaneously, conventional current flows through inductor 32 and the collector of transistor 24 to ground, and is increasing with time under the impetus of the voltage on capacitor 34, which is shown in FIG. 2a as waveform 200. As increasing current flows in inductor 32 after time T3, as shown in FIG. 2b, the voltage across capacitor 34 decreases in a parabolic fashion as charge is removed at an increasing rate. In the absence of linearity correction inductor 42, the deflection current during the horizontal trace interval T1-T6 will have a waveform illustrated by solid line 210 of FIG. 2b.

At time T6, transistor 24 is rendered nonconductive by application of a negative-going signal to its base from oscillator 10 to begin the retrace interval. This opens switch 25, and the energy stored as current flow in inductors 28 and 32 begins to be transferred to retrace capacitor 30 in a resonant manner, with a frequency having a period of twice the retrace interval. The voltage across capacitor 30 rises, and the current in inductors 28 and 32 decreases to zero as the retrace voltage across voltage capacitor 30 peaks at time T0. At this time, energy in the oscillatory circuit including inductor 32 and capacitor 34 has been transferred to retrace capacitor 30. Additionally, energy stored in inductor 28 has also been transferred to capacitor 30.

The high retrace voltage across capacitor 30 at and immediately after T0 reverses current in inductors 28 and 31 and current flows into B+ and into capacitor 34 at an increasing rate, while the voltage across capacitor 30 drops. The rate of increase of current in the deflection winding depends upon the impedance of windings 32 and 42. The voltage across capacitor 30 continues to decrease until a time at which the voltage across capacitor 30 equals B+. At this time, there is no net voltage across the inductors, and the currents no longer increase. Charge continues to be removed from capacitor 30, however, and the voltage across capacitor rapidly decreases in a resonant manner to zero at a time T1, at which time diode 26 becomes conductive, retrace ends and the trace interval begins.

During the first half of the horizontal trace interval, diode 26 conducts as the energy stored as current in winding 32 flows into capacitor 34. As the current decreases in winding 32 during the first half of the horizontal trace interval, the voltage across capacitor 34 rises parabolically as indicated by waveform portion 200 of FIG. 2a.

The parabolically varying voltage across capacitor 34 attributable to the flow of deflection current in winding 32 causes the rate of change of current in winding 32 to be greater near the center of the horizontal scanning interval compared with the beginning and end. This corresponds to a lesser rate of change of scanning current at the left and right of the screen compared with the center, which is the well-known bilateral (both sides) S-correction. Winding 32 and capacitor 34 may be viewed as a resonant circuit having a period, with the horizontal scanning interval extending over the more linear central portion of the resonant interval.

In the case of a wide deflection angle and/or a kinescope screen having a large radius of curvature, the S-correction if adapted to correcting compression at the principal central portions of the trace, has too small a rate of increase of scanning current at the left and right extremes, as mentioned. This results in a properly corrected principal central portion of the scan and a compressed portion at the left and right extremes.

The curvature of waveform 210 is exaggerated to illustrate the reduction in the rate of current scanning near the extremes of the scanniing interval. For example, in time intervals T1 to T2 and T5 to T6, deflection current waveform 210 as illustrated has a rate of change opposite to that occurring during the principal portion T2-T5 of the trace interval. While such a reversal would in actuality cause "foldover" in the scanning at the edges of the raster, waveform 210 illustrates the type of compression which can occur when large amounts of S-correction are applied.

In accordance with the invention, inductor 42 having saturable core 44 coupled in series with deflection winding 32 represents a bilateral variable impedance in series with deflection winding 32. Near the extremes of the scan, the impedance of the reactor is reduced. This results in an increased rate of change of the deflection current at the left and right extremes of the scan. This increased rate of change compensates for the bilateral compression created by the S-capacitor.

The current flow in inductor 42 equals that in winding 32 and is illustrated by waveform 210 in FIG. 2b. The impedance characteristics of inductor 42 as influenced by the change in permeability of core 44 due to the flow of deflection current in the inductor is shown in FIG. 2c. As shown, the impedance Z42 has a generally parabolic shape which is a maximum near the center T3 of the scanning interval and which is a minimum near the beginning T1 and the end T6 of the scanning interval.

Figure 3:
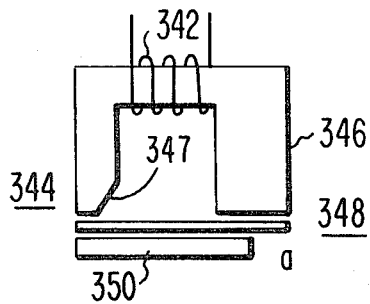
FIG. 3 illustrates a structure which may be used in conjunction with the arrangement of FIG. 1, and its characteristics.
Figure 3:
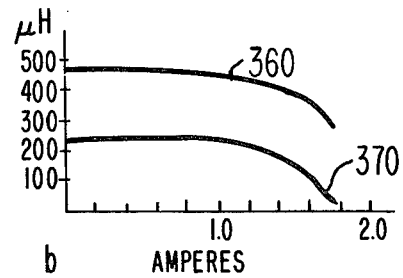

FIG. 3 illustrates a structure which may be used as saturable inductor 42 and core 44 of FIG. 1. In FIG. 3a, a core designated generally as 344 is composed of a C-section 346 of saturable magnetic material and a bar 350 of a similar material spaced from the ends of C-section 346 by a nonmagnetic material 348. Windings 342 are wound about a leg of C-section 346. FIG. 3b illustrates an inductance versus current curve 360 which may be produced by a structure such as that of FIG. 3a. One leg of C-section core 346 has a bevel 347. The amount of bevel influences the rate of saturation of the core and thus influences the shape of inductance-current curve 360. More, less or no bevelling may be required in particular circumstances. It is not essential that the legs of core 346 have different cross-sections as illustrated in FIG. 3a.

While the structure of FIG. 3a is satisfactory, it may be desirable to have a lower overall inductance in order to keep the deflection supply voltage to a minimum. For this purpose, windings 342 may be wound about bar 350, giving an inductance versus current curve such as that illustrated by 370 of FIG. 3b. Bar 350 has a smaller cross-sectional area than C-core 346. Therefore, the inductance of a given coil at a low current will be less than that obtained with core 346. Also, bar 350 saturates more abruptly at high coil currents and provides a larger relative change in inductance. The proportional rate of decrease of the inductance represented by curve 370 near the maximum current point is greater than that of curve 360 for providing an increased correction at the extremes of scan.

Other embodiments of the invention will be apparent to those skilled in the art. In particular, magnetic core 44 may be biased by means of a magnetic field in such a manner as to additionally provide correction for the raster nonlinearities attributable to the resistance of the deflection winding, thus eliminating the need for the conventional linearity coil. As an alternative to the series connection of linearity correction circuit 40 with the deflection winding, a parallel connection may be used in which the resistance, impedance or reactance of the element in parallel with the deflection winding is controlled at the horizontal rate to be high at the extremes of the trace interval, and low near the center of the trace interval.

What is claimed is:

1. An arrangement for deflecting the electron beam for a wide-angle kinescope, comprising:
   a deflection winding disposed about the kinescope;
   deflection current generator means coupled to said deflection winding for promoting the flow of a recurrent deflection current at a deflection rate in said deflection winding for causing the kinescope beam to scan a raster on the face of the kinescope, said raster having a bilateral-geometric distortion having the appearance of progressive expansion towards the raster sides and progressive compression towards the raster center;
   S-correction capacitance means serially coupled with said deflection winding for symmetrically correcting said compression towards said raster center, said S-correction means causing excessive correction of said progressive expansion towards said raster sides;
   variable impedance means coupled with said deflection winding and varied for linearity correction;
   wherein the improvement resides in that said variable impedance means varies in a bilateral manner at said deflection rate to increase the time rate of change of said deflection current towards said raster sides.

2. An arrangement according to claim 1 wherein said variation of said variable impedance means is substantially symmetrical.

3. An arrangement according to claim 1 or 2 wherein said variable impedance means comprises controllable inductance means controlled for variation at said deflection rate.

4. An arrangement according to claim 1 wherein said variable impedance means comprises saturable reactance means and said variable impedance means is varied in a substantially symmetrical manner.

5. An arrangement according to claim 4 wherein said saturable reactance means is self-saturating.

6. An arrangement according to claim 5 wherein said saturable reactance means is coupled in series with said deflection winding and is varied at said deflection rate under control of said deflection current.

7. An arrangement according to claim 1 wherein said excessive correction of said progressive expansion towards said raster sides caused by said S-capacitor results from excessive reduction in the time rate of increase of said deflection current near said raster sides; and said variable impedance means comprises self-saturating inductance means serially coupled with said deflection winding and responsive to said deflection current to vary impedance in such a manner as to cause an increase in the time rate of increase of said deflection current near the left and right extremes of the raster for compensating said excessive reduction.

* * * * *

Disclaimer 4,176,303.—*William E. Babcock*, Warren, N.J., and *Ronald L. Hess*, Zionsville, Ind. TELEVISION S-CORRECTION LINEARITY DEVICE. Patent dated Nov. 27, 1979. Disclaimer filed Mar. 5, 1982, by the assignee, *RCA Corp.*

Hereby enters this disclaimer to all claims of said patent.

[*Official Gazette May 25, 1982.*]